(12) United States Patent
Sumita et al.

(10) Patent No.: US 10,522,259 B2
(45) Date of Patent: Dec. 31, 2019

(54) NUCLEAR POWER GENERATION SYSTEM UTILIZING THERMAL EXPANSION IN METALLIC MEMBERS TO MOVE A NEUTRON REFLECTOR

(71) Applicant: CLEAR INC., Tokyo (JP)

(72) Inventors: Osao Sumita, Tokyo (JP); Isao Ueno, Tokyo (JP); Takehiko Yokomine, Onojo (JP)

(73) Assignee: CLEAR INC., Tokyo (JP)

(*) Notice: Subject to any disclaimer, the term of this patent is extended or adjusted under 35 U.S.C. 154(b) by 428 days.

(21) Appl. No.: 15/329,646

(22) PCT Filed: Jan. 25, 2016

(86) PCT No.: PCT/JP2016/052053
§ 371 (c)(1),
(2) Date: Jan. 27, 2017

(87) PCT Pub. No.: WO2016/157961
PCT Pub. Date: Oct. 6, 2016

(65) Prior Publication Data
US 2017/0213610 A1    Jul. 27, 2017

(30) Foreign Application Priority Data

Apr. 2, 2015 (JP) ................. 2015-075942

(51) Int. Cl.
*G21C 7/10* (2006.01)
*G21D 3/12* (2006.01)
(Continued)

(52) U.S. Cl.
CPC ................. *G21D 3/12* (2013.01); *G21C 1/02* (2013.01); *G21C 1/06* (2013.01); *G21C 7/02* (2013.01);
(Continued)

(58) Field of Classification Search
CPC ... G21D 3/12; G21D 3/16; G21C 1/02; G21C 1/06; G21C 7/02; G21C 7/10; G21C 7/28; G21C 11/06
(Continued)

(56) References Cited

U.S. PATENT DOCUMENTS

| 3,321,371 A * | 5/1967 | Kambara | ............. G21C 7/06 |
| | | | 376/220 |
| 2010/0239060 A1 * | 9/2010 | Horie | .................. G21C 7/28 |
| | | | 376/220 |
| 2015/0049850 A1 * | 2/2015 | Hattori | ................ G21C 7/28 |
| | | | 376/211 |

FOREIGN PATENT DOCUMENTS

JP    61-1228381 A    10/1996
JP    H09-72980 A    3/1997
(Continued)

OTHER PUBLICATIONS

International Search Report issued in PCT/JP2016/052053, dated Feb. 23, 2016.

*Primary Examiner* — Jack W Keith
*Assistant Examiner* — Daniel Wasil
(74) *Attorney, Agent, or Firm* — Patterson + Sheridan, LLP

(57) ABSTRACT

A nuclear power generation system being safe and easily controlled by load following. The nuclear power generation system has a nuclear reactor employing a load following control method. The reactor includes: a fuel assembly reactor core having metallic fuel containing at least one selected from uranium-235, uranium-238 and plutonium-239; a reactor vessel containing the reactor core; metallic sodium loaded into the reactor vessel and heated by the reactor core; and a neutron reflector for achieving criticality in the reactor core with effective multiplication factor of neutrons emitted from the reactor core being maintained at or above about 1.

(Continued)

The neutron reflector is coupled to spring or spiral metallic members and utilizing heat deformation in the metallic members due to the temperature in coolant metallic sodium to control the fast neutron reflection efficiency of the neutron reflector.

19 Claims, 12 Drawing Sheets

(51) Int. Cl.
| | | |
|---|---|---|
| *G21C 1/02* | (2006.01) | |
| *G21C 7/02* | (2006.01) | |
| *G21C 7/28* | (2006.01) | |
| *G21C 1/06* | (2006.01) | |
| *G21C 11/06* | (2006.01) | |
| *G21D 3/16* | (2006.01) | |
| *G21C 7/00* | (2006.01) | |
| *G21D 3/08* | (2006.01) | |

(52) U.S. Cl.
CPC ............... *G21C 7/10* (2013.01); *G21C 7/28* (2013.01); *G21C 11/06* (2013.01); *G21D 3/16* (2013.01); *G21C 7/00* (2013.01); *G21D 3/08* (2013.01); *Y02E 30/34* (2013.01); *Y02E 30/39* (2013.01)

(58) Field of Classification Search
USPC .......................................... 376/207, 220, 285
See application file for complete search history.

(56) References Cited

FOREIGN PATENT DOCUMENTS

| | | |
|---|---|---|
| JP | 2000-088987 A | 3/2000 |
| JP | 2001-208884 A | 8/2001 |
| JP | 2003-114292 A | 4/2003 |
| JP | 2008-122248 A | 5/2008 |
| WO | 2013094196 A1 | 6/2013 |

\* cited by examiner

NUCLEAR POWER GENERATION SYSTEM UTILIZING THERMAL EXPANSION IN METALLIC MEMBERS TO MOVE A NEUTRON REFLECTOR

INCORPORATION BY REFERENCE

This application claims priority based on Japanese Patent Application No. 2015-75942 filed on Apr. 2, 2015, the disclosure of which is incorporated herein by reference.

TECHNICAL FIELD

The present invention relates to a small nuclear power generation system, and more particularly to a small nuclear power generation system having cooling systems that are at least separated to primary and secondary systems and including a load following control system in which a nuclear reaction in a small nuclear reactor is automatically controlled.

BACKGROUND ART

Known examples of nuclear reactors in nuclear power generation systems include an indirect-cycle reactor for generating electricity by rotating a turbine with radiation-uncontaminated water vapor. Such a nuclear reactor has steam generators and heat exchangers between the primary and secondary cooling systems.

A loop-type fast reactor intended for the construction of a large power generation system transfers the heat in the primary sodium system (primary cooling system) generated by cooling the reactor core to the secondary sodium system (secondary cooling system) through intermediate heat exchangers, and also transfers the heat in the secondary sodium system to a water-steam system through an evaporator and a superheater. Similarly, a pool-type fast breeder reactor with a larger reactor vessel containing the pump of the primary sodium system and the intermediate heat exchangers transfers the heat in the primary sodium system to the secondary sodium system through the intermediate heat exchangers, and also transfers the heat in the secondary sodium system to the water-steam system through the steam generators.

A nuclear reactor in such a large power generation system includes a reactor core having the assemblies of a large number of fuel rods, each of which is a cladding tube containing fuel pellets made of metallic oxides including uranium-235 or plutonium-239, which has low heat transfer characteristics. The reactor core of a large nuclear reactor has about 200 fuel assemblies, each of which is a bundle of several tens of fuel rods, and control rods for controlling the reaction rate of the fuel are positioned between these fuel assemblies. In such a large nuclear reactor having control rods, a loss of the control of rod functionality due to, for example, trouble in the mechanism of controlling the positions of the control rods may cause a runaway of nuclear reactions in the reactor core.

Nuclear reactors other than fast breeder reactors, such as a pressurized light-water reactor, transfer the heat in the primary coolant generated by cooling the reactor core to the water-steam system through the steam generators. Such a nuclear reactor also has control rods positioned between the fuel assemblies contained in the reactor for controlling the reaction rate in the reactor core.

CITATION LIST

Patent Literature

Patent Literature 1: WO 03/007310

Non Patent Literature

Non Patent Literature 1: NISHIYAMA Takaaki, "Genshiryokudenki suishin shisutemu ni okeru uchuuyou genshiro no teian (Proposal of Space Reactor in Nuclear Electric Propulsion System)," Graduation Thesis, Department of Energy Science and Engineering, Faculty of Engineering, Kyushu University, February 2009

Non Patent Literature 2: W. F. Murphy, W. N. Beck, F. L. Brown, B. J. Koprowski, and L. A. Neimark, "POSTIRRADIATION EXAMINATION OF U—Pu—Zr FUEL ELEMENTS IRRADIATED IN EBR-II TO 4.5 ATOMIC PERCENT BURNUP," ANL-7602, November 1969

SUMMARY OF INVENTION

Technical Problem

In a loop-type fast breeder reactor intended for the construction of a large power generation system and an indirect-cycle reactor such as a pressurized light-water reactor, which are both described above, heat transfer between the cooling systems is conducted through the steam generators and the heat exchangers independent of each other or contained in separate chambers and connected to each other with pipes, and thus the overall cooling system is large and complicated. In particular, fast breeder reactors and other reactors intended for power generation have the primary cooling system that uses metallic sodium as coolant and has a large number of loops, each of which is coupled to loops of the secondary cooling system. Thus, the pipes, pumps, heat exchangers, steam generators, and the like tend to increase in number, and accordingly the cooling systems significantly grow in size and complexity.

Furthermore, a large nuclear reactor for the construction of a large power generation system, which controls the nuclear reaction rate in the reactor core using the control rods positioned between the fuel assemblies, needs a system of monitoring the control rods, for example, and thus the structure of the reactor itself is complicated. Thus, the cost of manufacturing the nuclear reactor is enormous, and additionally a large number of workers and monitoring facilities are needed for the maintenance and management.

Pool-type fast breeder reactors have been proposed to provide a reactor smaller than loop-type fast reactors and achieve a load following control method. Such a pool-type fast reactor also needs the intermediate heat exchangers and the steam generators for the avoidance of a risk in metallic sodium used to cool the reactor core. Thus, reductions in the size and complexity of the cooling system are inadequate. Additionally, the reactor includes other engineering safety systems such as control rods and an emergency core cooling system. These complicated safety systems may lead to a nuclear power generation system that is too expensive.

Under such circumstances, nuclear reactors featuring enhanced safety and including control systems configured to be simpler and smaller for achieving inexpensive power generation systems have been proposed. One of these reactors is described, for example, in Patent Literature 1. The nuclear reactor disclosed in Patent Literature 1 has no intermediate heat exchangers or steam generators, and includes a double container storing the primary cooling system and the secondary cooling system to substantially reduce the number of pipes for the primary and secondary cooling systems. As a result, this nuclear reactor has a reduced size. Nevertheless, Patent Literature 1 describes no nuclear reaction control, and thus this nuclear reactor is different from a reactor employing a load following control method according to the present invention.

An object of the present invention is to provide a small nuclear power generation system with the reduced-size overall system including a nuclear reactor and a power generation system. Another object of the invention is to provide a load following safe small nuclear power generation system that is easily controlled. Still another object of the invention is to provide a nuclear power generation system involving a lower manufacturing cost and reduced costs of the maintenance and management.

Solution To Problem

The present invention provides a safe small nuclear power generation system easily controlled and having a zero probability of re-criticality or other accidents. This system is achieved using a smaller nuclear reactor that is loaded with metallic fuel including zirconium (Zr), plutonium (Pu), and uranium (U) and employs a load following control method in which a reflector is deformed and moved by utilizing the thermal expansion of a metallic member coupled to the reflector. That is, the present invention provides a smaller nuclear reactor and a smaller power generation system that allow load following control by controlling the fast neutron reflection ability utilizing a heat deformation in a metallic member caused by a variation in thermal output.

The load following control method will now be described first.

Load Following Control Method

The load following control method utilizing basic factors in natural phenomena such as heat, rather than the control rods for typical nuclear reactors, has two main control factors: (1) control of the probability and amount of neutron leakage, and (2) control of neutron generation efficiency.

(1) Control of Probability and Amount of Neutron Leakage

Neutron fluxes generated from fissile materials such as Pu and U contained in fuel rods are broadly classified into two main categories: neutrons leaking from the system, for example, moving to outside of the nuclear reactor; and neutrons reabsorbed by the fuel rods to contribute to nuclear fission. The percentage of the neutrons leaking from the system depends on the following parameters.

(1-1) Efficiency of Reflector

The neutron flux density in the reactor core highly depends on the reflection efficiency of the reflector surrounding the reactor core. An efficient reflector may allow the neutron multiplication factor to be 1 or more. Changing the reflection efficiency in accordance with the thermal output from the reactor core allows the load following control method.

(1-2) Characteristics of Coolants

Examples of coolants used in the present invention include metallic sodium, lead, and lead-bismuth. The characteristics of each will now be described.

[Density of Metallic Sodium, Coolant]

The density of metallic sodium depends on the temperature, and more specifically on the coefficient of thermal expansion. The density decreases as the temperature rises, and accordingly the probability of neutron leakage increases; as a result, the neutron multiplication factor decreases to approach 1. When the temperature rises further, the neutron multiplication factor becomes 1 or less, and the criticality of the nuclear reactor cannot be sustained. Conversely, as the temperature decreases, the probability of neutron leakage decreases and the neutron multiplication factor becomes 1 or more; as a result, the nuclear fission chain reaction can be sustained.

Metallic sodium, which has a boiling point of 880° C., does not usually cause a problem of void formation. However, the metallic sodium in contact with the fuel rods may be heated to high temperatures, and very few voids may be formed at a temperature equal to or lower than the boiling point. As a result, the void coefficient of reactivity may be positive. However, the problem of the void coefficient may be advantageously eliminated if the neutron leakage is large at high temperatures in a small reactor core.

[Other Coolants]

Coolants for fast reactors other than metallic sodium include lead, which has a small neutron absorption cross section and no influence on a neutron flux. However, lead has a disadvantage of a relatively high melting point of 325° C. Thus, lead-bismuth (45.5% Pb and 55.5% Bi), which has a lower melting point, may also be an effective coolant. Lead-bismuth has a melting point of 125° C., which is lower than the melting point of lead.

(1-3) Ratio of Nuclear Reactor Surface Area to Volume

The number of neutrons generated depends on the volume of the nuclear reactor, and the neutron leakage depends on the surface area of the nuclear reactor. That is, the percentage of leaking neutrons depends on the ratio of the reactor surface area to the volume. In other words, the percentage of leaking neutrons increases as the reactor core becomes smaller.

The number of neutrons generated also depends on the concentrations of fissile Pu and U contained in the metallic fuel rods.

(2) Control of Neutron Generation Efficiency

Controlling a fast neutron flux generated from the fuel rods is important. Conventional fuel rods have been mainly made of oxide fuel in which variations such as swelling at high temperatures are small. To achieve the objects of the present invention, metallic fuel rods are desirably used to lower the neutron generation efficiency at high temperatures. Swelling, expansion, or the like occurring in the fuel rods at high temperatures reduces the concentration of nuclear materials such as Pu and U, and thus the nuclear reaction efficiency. In fact, metallic fuel rods tend to experience thermal expansion at high temperatures. Non Patent Literature 2 reports that the expansion coefficient of U—Pu—Zr ternary alloy fuel increases by three orders of magnitude at temperatures from 600 to 650° C. or higher. In summary, when the fuel rods reach high temperatures, the nuclear reaction efficiency decreases, and thus the temperature also decreases. In this manner, the load following control method is achieved.

The effect of the reflector will now be described.

[Effect of Reflector]

A specific example of the effect of the reflector is shown in Non Patent Literature 1, which describes a design of an experimental space small reactor. First, fuel of uranium dioxide ($UO_2$: 20% concentration) particles coated with graphite and silicon was dispersed in a spherical reactor core made of graphite to increase the mass of the reactor core to 9,000 kg, but the critical condition, the effective multiplication factor $K_{eff}$>1, was not satisfied (FIG. 3.3). However, when a reflector was provided around such a reactor core with a radius of 20 cm, $K_{eff}$ could be higher than 1.

According to Non Patent Literature 1, when beryllium (Be) or beryllium oxide (BeO) was used as a reflective material, a reflector having a thickness of 10 cm or more achieved criticality with $K_{eff}$ higher than 1, whereas a reflector made of graphite was less efficient, but such a reflector thicker than 30 cm satisfied the critical condition (FIG. 3.5). Thus, it can be seen that the effect of a reflector is significant in a small reactor core.

A small nuclear power generation system according to the present invention, which is proposed to the above-described objects, has a nuclear reactor comprising: a reactor core having a plurality of fuel rods being cladding tubes containing metallic fuel; a reactor vessel containing the reactor core; a primary coolant being metallic sodium loaded into the reactor vessel and heated by the reactor core; and at least one neutron reflector provided around the reactor core to achieve criticality in the reactor core with the effective multiplication factor ($K_{eff}$) of neutrons emitted from the reactor core being maintained at or above about 1.

The reactor core of the nuclear reactor has a plurality of assemblies of fuel rods being cladding tubes made of ferritic stainless steel or chromium-molybdenum steel, the cladding tubes containing metallic fuel of an alloy of zirconium, uranium (235, 238), and plutonium-239 or an alloy of zirconium and one of uranium (235, 238) and plutonium 239. Uranium-238 contained in uranium fuel absorbs neutrons to generate plutonium-239 when the reactor operates.

The small nuclear power generation system further comprises a main heat exchanger outside the nuclear reactor. The main heat exchanger is supplied with the primary coolant heated by the nuclear reactor through a conduit. The main heat exchanger includes a circulating secondary coolant heated by heat exchange with the primary coolant. In an embodiment of the present invention, the secondary coolant is, for example, supercritical carbon dioxide. The small nuclear power generation system also comprises a turbine driven by the circulating secondary coolant heated by the main heat exchanger, and an electric generator that operates due to the driven turbine.

In the present invention, the neutron reflector provided around the fuel assemblies contained in the nuclear reactor falls roughly into the following two types. The first reflector has a height lower than the height of the fuel assemblies and is supported such that the reflector can move upward or downward along the fuel assemblies. For simplicity, the movement with the movement mechanism is desirably downward. Alternatively, moving the reflector from a consumed part of the nuclear fuel in the fuel assemblies to an unconsumed part allows nuclear reactions to continue over a long period with the reactivity of the nuclear fuel being under control. The second reflector has a height that can cover the overall fuel assemblies. This reflector is not moved, and thus the period of the nuclear reactor operation is shorter than the case of the first reflector.

The small nuclear power generation system according to the present invention further comprises a small nuclear reactor having a specific structure as described below.

This reactor includes:

a reactor core having fuel assemblies of a plurality of fuel rods being cladding tubes containing metallic fuel including one or both of uranium-235, 238 and plutonium-239;

a reactor vessel containing the reactor core;

a primary coolant being one of metallic sodium, lead (Pb), and lead-bismuth (Bi) loaded into the reactor vessel and heated by the reactor core; and at least one neutron reflector provided around the reactor core.

The neutron reflector has neutron reflection efficiency for achieving criticality in the reactor core with the effective multiplication factor of neutrons emitted from the reactor core being maintained at or above about 1. The neutron reflector is also coupled to metallic members having a coefficient of thermal expansion higher than that of the reflector itself, and changes the neutron reflection efficiency utilizing displacement due to thermal expansion of the metallic members in accordance with the temperature in the reactor vessel, thereby achieving load following control.

The neutron reflector provided around the reactor core has a height lower than the height of the reactor core and can move upward or downward along the reactor core with a movement mechanism.

Alternatively, the neutron reflector provided around the fuel assemblies may have a length comparable with the full length of the fuel assemblies.

Alternatively, the metallic members allowing control of the neutron reflection efficiency utilizing thermal expansion may be spring-like or spiral, and a neutron reflector having the metallic members may be provided around and above the fuel assemblies.

The at least one neutron reflector is a plurality of neutron reflectors provided on a concentric circle about the center of the reactor core and divided into two or more sections on the concentric circle, the reflectors having two radiuses. The neutron reflectors are classified into a first group having one radius and a second group having the other radius. The neutron reflectors of the first group are coupled to a first spiral metallic member provided on a concentric circle of the reactor core. Due to thermal expansion of the first spiral metallic member, slits are formed between the neutron reflectors of the first group and the neutron reflectors of the second group, and gaps between the slits are adjusted based on the temperature in the reactor vessel.

The neutron reflectors may be further radially divided into two or more sections.

The reflectors of the second group may also be coupled to a second spiral metallic member provided on a concentric circle of the reactor core, and the first spiral metallic member and the second spiral metallic member may spiral in opposite directions.

The material of the neutron reflector is selected from beryllium (Be), beryllium oxide (BeO), graphite, carbon, and stainless steel.

Carbon may be provided as a lubricant between the neutron reflectors of the two groups.

The neutron reflectors of the first and second groups may have circumferential overlaps, and the widths of the overlaps may be adjusted to achieve a temperature at which criticality reaches 1.

Alternatively, a fixation cylinder for fixing adjustment springs being the metallic members may be provided outside the neutron reflectors divided into two or more sections on a concentric circle, and a plurality of reflector moving jigs, each of which includes an adjustment spring support plate, a reflector adjusting rod, and one of the adjustment springs, for the divided neutron reflectors may be provided outside the fixation cylinder. Each of the reflector adjusting rods is coupled to the corresponding neutron reflector, and thermal expansion of the adjustment spring is transferred via the reflector adjusting rod fixed to the adjustment spring support plate, such that the neutron reflector moves away from the fuel assemblies, whereby load following control for the output from the nuclear reactor is enabled.

Alternatively, multi-layer ring neutron reflectors divided into two or more sections are placed on a concentric circle and along the fuel rods, the spring-like metallic members are provided outside and around the multi-layer ring neutron reflectors, different divisions of the multi-layer ring neutron reflectors are coupled to different ones of the spring metallic members, thermal expansion of the spring metallic members is transferred to the divided ring neutron reflectors, and the probability of neutron leakage is adjusted by changing the gaps between the divided neutron reflectors, whereby load following control for the output from the nuclear reactor is enabled.

Alternatively, each of the neutron reflectors divided into two or more sections on a concentric circle has a supporting rod along the fuel rod and at one end of the neutron reflector, and each neutron reflector is rotatable outward about the supporting rod, thereby allowing the neutron reflectors to open. Due to thermal expansion of the spiral metallic members coupled to the supporting rods each being a center of rotation of the corresponding neutron reflector, the probability of neutron leakage is adjusted by varying a degree of opening between the neutron reflectors, whereby load following control for the output from the nuclear reactor is enabled.

The spring or spiral metallic members are made of stainless steel, a nickel based superalloy, or a nickel-cobalt based superalloy.

The spring metallic members or the spiral metallic members may be bimetal. The materials of the bimetal may be the combination of a nickel (Ni)-iron (Fe) alloy as a low expansion material and one of copper (Cu), nickel (Ni), copper-zinc (Zn), nickel-copper, nickel-manganese (Mn)-iron, nickel-chromium (Cr)-iron, and nickel-molybdenum (Mo)-iron as a high expansion material. The high expansion material is desirably nickel-manganese-iron or nickel-chromium-iron.

The small nuclear power generation system according to the present invention may have a neutron absorber outside the neutron reflector.

The neutron absorber may be a material suitable for disposal of radioactive waste and the like such as actinoids.

The reactor core has multiple fuel rods being cladding tubes made of ferritic stainless steel or chromium-molybdenum steel, the cladding tubes containing metallic fuel of an alloy of zirconium (Zr), uranium (235, 238), and plutonium-239 or an alloy of zirconium and one of uranium (235, 238) and plutonium-239.

The reactor vessel is a cylinder with a diameter of 5 m or less and a height of 15 m or less. The reactor core contained in the reactor vessel has multiple fuel rods with a diameter of 5 to 15 mm and a length of 3.0 m or less.

The small nuclear power generation system according to the present invention further comprises: a main heat exchanger provided outside the nuclear reactor and supplied with the primary coolant heated by the nuclear reactor through a conduit, the main heat exchanger including a circulating secondary coolant heated by heat exchange with the primary coolant, the secondary coolant being supercritical carbon dioxide; a turbine driven by the secondary coolant heated by the main heat exchanger; and an electric generator that operates due to the driven turbine.

Another small nuclear power generation system according to the present invention further comprises: a main heat exchanger provided outside the nuclear reactor and supplied with the primary coolant heated by the nuclear reactor through a conduit, the main heat exchanger including a circulating secondary coolant heated by heat exchange with the primary coolant, the secondary coolant being light water; a turbine driven by the secondary coolant heated by the main heat exchanger; and an electric generator that operates due to the driven turbine.

Still another small nuclear power generation system according to the present invention further comprises: a turbine provided outside the nuclear reactor and, with the nuclear reactor being loaded with the primary coolant causing no reaction with light water, driven by a secondary coolant heated by heat exchange with the primary coolant in the reactor vessel, the secondary coolant being light water; and an electric generator that operates due to the driven turbine.

Advantageous Effects of Invention

The present invention has a reactor vessel with a diameter of 5 m or less and a height of 15 m or less, and the reactor vessel contains a reactor core having fuel rod assemblies with a diameter of 5 to 15 min and a length of 3.0 m or less. This invention can thus achieve a smaller nuclear reactor.

The nuclear reactor in a small nuclear power generation system according to the present invention uses metallic sodium as a primary coolant. Thus, upon a load following operation in Which the power generation output is varied in accordance with the variations in power consumption of a load connected to the power generation system, the reactivity of the nuclear fuel can be automatically controlled in accordance with the variations in power consumption of the load. This allows automatic operation of the power generation system.

In the present invention, the primary coolant loaded into the reactor vessel is circulated with a pump, and thus metallic sodium, lead, or lead-bismuth constituting the primary coolant can be reliably circulated.

In the present invention, the primary coolant heated by the nuclear reactor is supplied into a heat exchanger provided outside the nuclear reactor, and heat exchange with a secondary coolant having supercritical carbon dioxide is performed. Thus, a secondary coolant circulating system including the heat exchanger and a turbine can be provided outside the nuclear reactor. This facilitates maintenance on the power generation system.

A circuit in which the secondary coolant driving the turbine circulates is a closed loop, and thus the power generation system can become much smaller and experience lower loss of the secondary coolant.

Supercritical carbon dioxide used as the secondary coolant when the primary coolant is metallic sodium has a significantly high density compared with water or the like, and the turbine can thus be driven with a high degree of efficiency. This allows the turbine for driving the electric generator to become much smaller.

In addition, even if the secondary coolant that is supercritical carbon dioxide comes into contact with metallic sodium constituting the primary coolant, an accident such as explosion caused by a reaction between sodium and water cannot occur, resulting in a system with improved safety.

If the primary coolant is lead or lead-bismuth, which does not react with water, the secondary coolant can be water (light water). In this case, the nuclear reactor is preliminarily loaded with the primary coolant. The water, which is the secondary coolant, can be evaporated by heat exchange when being directly brought into contact with the primary coolant in the nuclear reactor. This allows the nuclear power generation system to become smaller.

DESCRIPTION OF EMBODIMENTS

Embodiments of the present invention are based on the results obtained using the comprehensive neutronics calculation code SRAC (Standard Reactor Analysis Code). The SRAC is a neutronics calculation code system applicable to reactor core analysis of various types of nuclear reactors. This system includes six data libraries (ENDF/B-IV, -V, -VI, JENDLE-2, -3.1, -3.2), integrated five modular codes, a collision probability calculation module (PIJ) applicable to 16 types of lattice models, Sn transport calculation modules, ANIS and TWOTRAN, diffusion calculation modules (TUD (1D) and CITATION (multi-D)), and two optional codes (ASMBURN, improved COREBURN) for fuel assembly and reactor core burn-up calculations. In the present invention, the collision probability calculation module (PIJ) and the Sn transport calculation modules, ANIS and TWOTRAN, were used to calculate criticality. The embodiments based on the results will now be described with reference to the drawings.

First, a nuclear reaction was confirmed based on the following basic specifications of the core of a small nuclear reactor.

Figure 1:
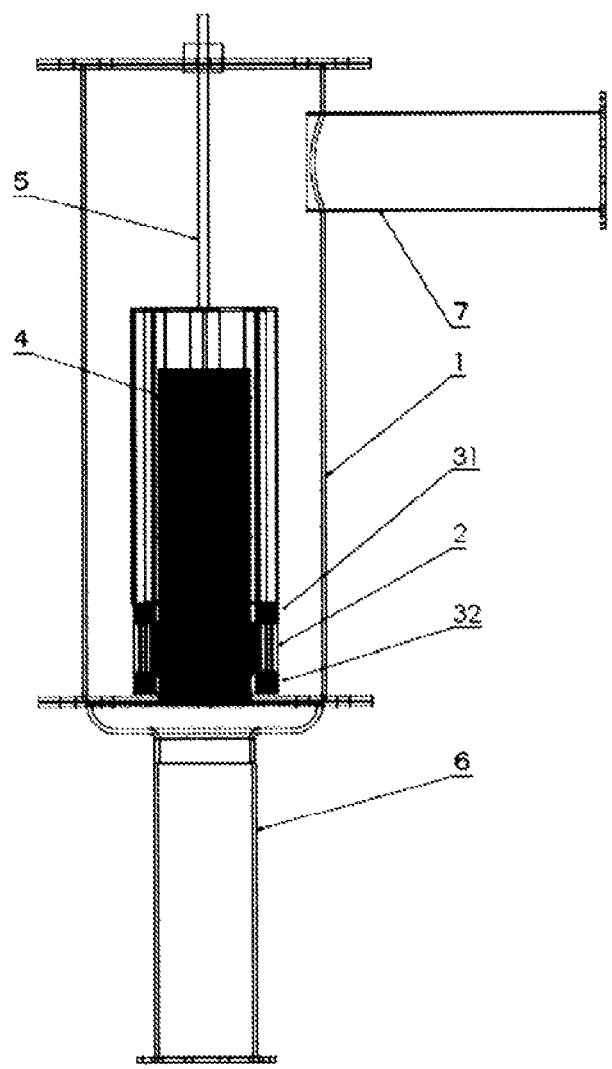
FIG. 1 is a schematic diagram illustrating an embodiment of a small nuclear reactor in a small nuclear power generation system according to the present invention.

[Basic Specifications]
Reactor core diameter: 85 cm
Reactor core height: 200 cm
Number of fuel assemblies: 60
Fuel pin diameter: 1 cm FIG. 1 is a schematic cross-sectional view illustrating the structure of the small nuclear reactor used for the calculation of criticality in a small nuclear reactor according to the present invention. A reactor vessel 1 made of low-alloy steel and the like is loaded with fuel assemblies 4, around which a neutron reflector 2 made of graphite is provided. The reflector can move upward or downward. To move the reflector, a reflector support mechanism 5 is mounted. This support mechanism is connected to a drive mechanism (not shown) provided above the nuclear reactor upper. However, the reactor is not limited to this structure. A reflector having a length comparable with the full length of the fuel assemblies may be provided around the fuel assemblies.

The bottom of the reactor vessel 1 has a coolant inlet pipe 6 through which liquid metal sodium that is a primary coolant is charged. The reactor vessel also has a coolant outlet pipe 7 through which a nuclearly heated coolant is discharged.

Figure 2:
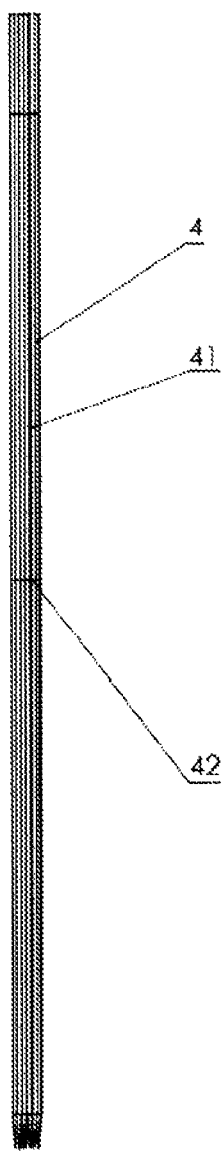
FIG. 2 is a side view illustrating the details of a fuel assembly in the small nuclear reactor according to the present invention illustrated in FIG. 1.

FIG. 2 illustrates the details of the fuel assemblies 4. Fuel rods 41 were each prepared by inserting a fuel pin made of Pu—U—Zr alloy steel and having a diameter of 10 mmϕ and a length of 200 mm into a cladding tube of ferritic stainless steel (HT-9 steel (Fe-12CH Mo-V, W), which is a reference steel of ferritic steel materials), and 24 fuel rods 41 were grouped into a fuel assembly 4 with a spacer 42. The reactor vessel was loaded with 60 fuel assemblies 4.

First Embodiment

Figure 3A:
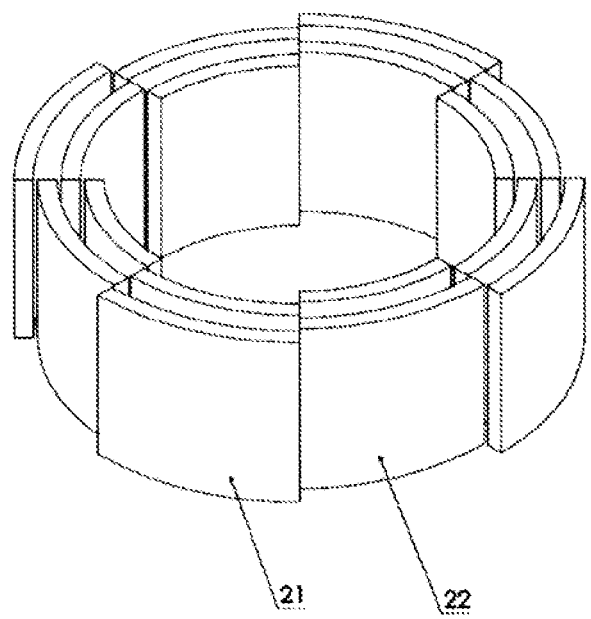
FIG. 3A is a perspective view illustrating an embodiment of a reflector for the small nuclear reactor according to the present invention.
Figure 3B:
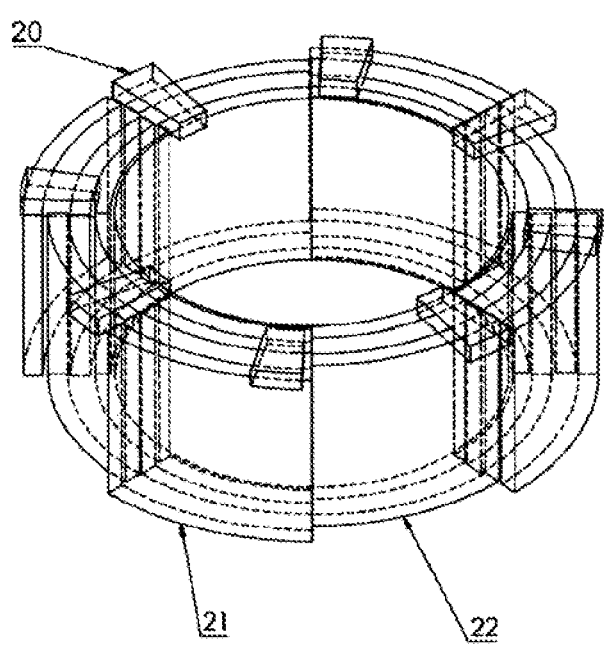
FIG. 3B is a perspective view illustrating the embodiment of the reflector for the small nuclear reactor according to the present invention.

The reflector, which is a key feature for load following control in the present invention, will now be described with reference to FIGS. 3A, 3B, and 4. As illustrated in FIG. 3A, the reflector has a double wall structure in which both walls made of graphite have a thickness of 10 cm. The reflector is circumferentially divided into eight sections of two types: reflectors A 21 and reflectors B 22. The two types of reflectors alternate and have different radiuses. This double wall structure is capable of accommodating one wall of adjacent reflectors each other when the reflectors are circumferentially shifted. As illustrated in FIG. 3B, the double wall structure having the reflectors A 21 and the reflectors B 22 is fixed by reflector support plates 20. The reflectors B 22 have an inner diameter of 52 cm and a height of 50 cm.

These two types of reflectors in the double wall structure are shifted to each other to form gaps (slits) between the reflectors A 21 and the reflectors B 22, which reduces the reflection efficiency. Carbon (e.g., graphite carbon particles) may be provided as a lubricant between the reflectors A 21 and the reflectors B 22. Although the reflectors in this embodiment have the double wall structure, the reflectors may have a single wall structure or a triple or greater wall structure, of course. Additionally, a neutron absorber suitable for disposal of radioactive waste and the like such as actinoids may be provided outside the reflectors in order to effectively use leaking neutrons.

Figure 4:
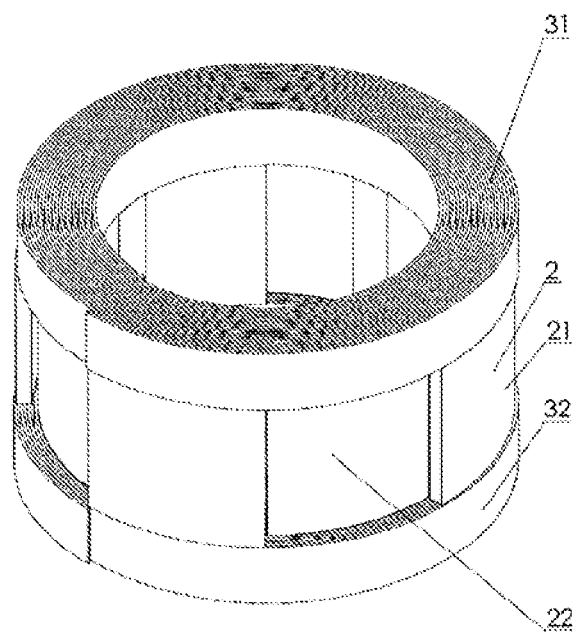
FIG. 4 is a perspective view illustrating another embodiment of the reflector for the small nuclear reactor according to the present invention.

As illustrated in FIG. 4, the top and bottom of the reflector 2 are further coupled to heat resistance spiral metallic members made of austenitic stainless steel. The reflectors A 21 are coupled to a spiral metallic member 31, whereas the reflectors B 22 are coupled to a spiral metallic member 32. These members spiral in opposite directions. The opposite directions of the upper and lower spirals allow reflector slits caused by thermal expansion to be wider.

Figure 5:
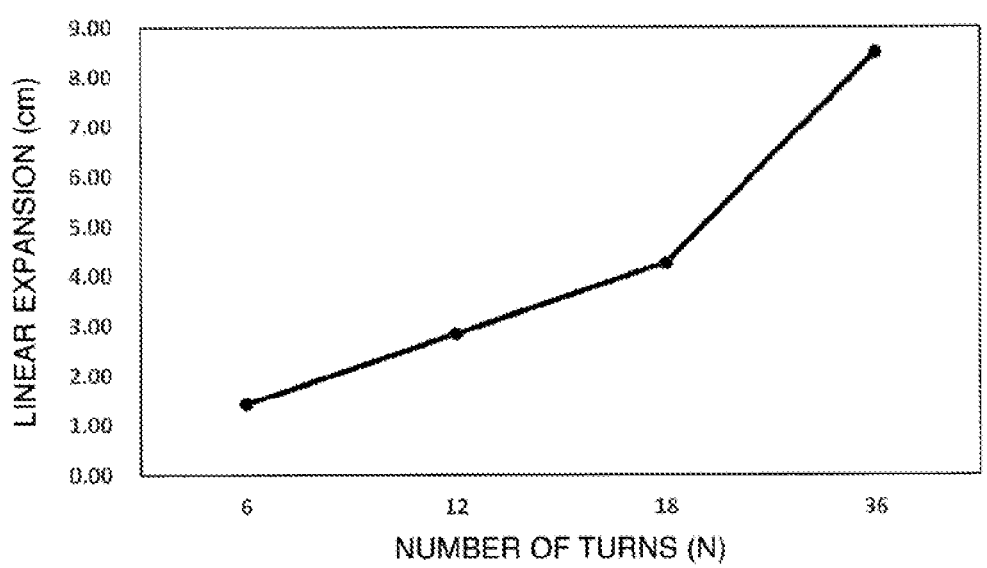
FIG. 5 is a graph showing the relationship between the number of turns of springs and linear thermal expansion of the reflector illustrated in FIG. 4.

FIG. 5 shows the relationship between the number of turns of the spirals and linear thermal expansion. With the innermost and outermost diameters of the spirals being fixed, the number of turns is changed by increasing the thickness of the spirals from 10 mm to 30 mm.

Figure 6:
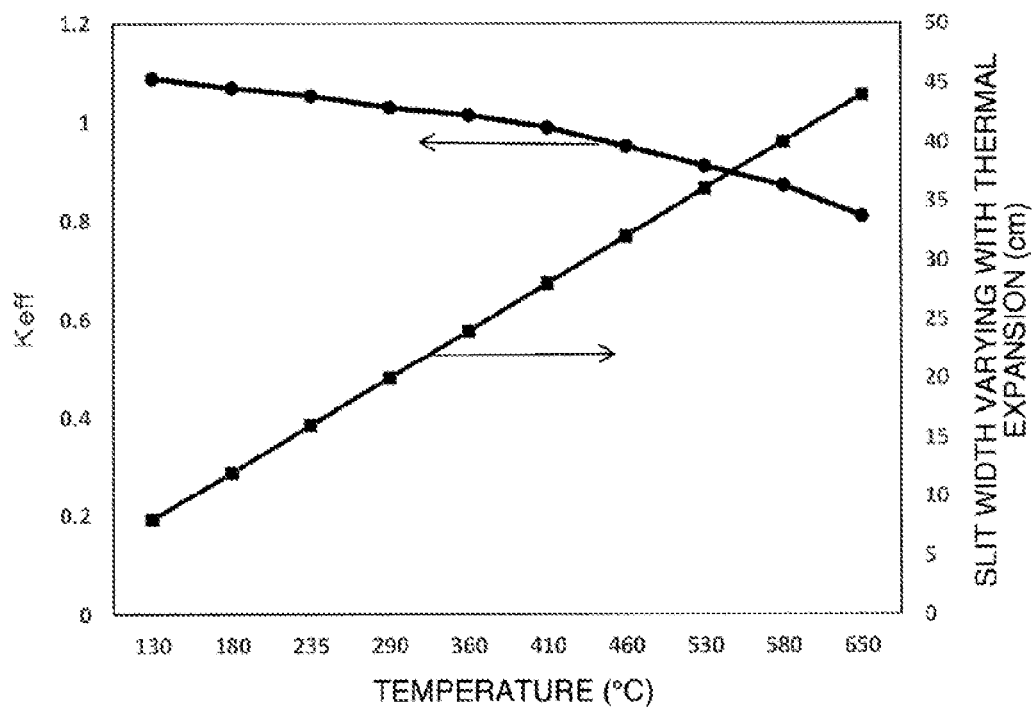
FIG. 6 is a graph showing the temperature dependence of the neutron effective multiplication factor $K_{eff}$ and the reflector slit width varying in response to the thermal expansion in a spring.

The relationship between the thermal expansion and the neutronics of the reflectors in this structure was calculated using the calculation code CITAION. FIG. 6 shows the temperature dependence of the neutron effective multiplication factor $K_{eff}$ and the reflector slit width associated with the thermal expansion in a spring. As is apparent from the drawing, $K_{eff}$ decreases to 1 or less with increasing temperature, resulting in a subcritical state. As temperature rises, the neutron economy deteriorates and thus the nuclear reaction efficiency decreases. Conversely, as temperature drops, the reflector efficiency is improved and thus the nuclear reaction efficiency is improved. This enables a nuclear fission reaction to be automatically controlled in accordance with the output from the nuclear reactor.

Second Embodiment

Figure 7:
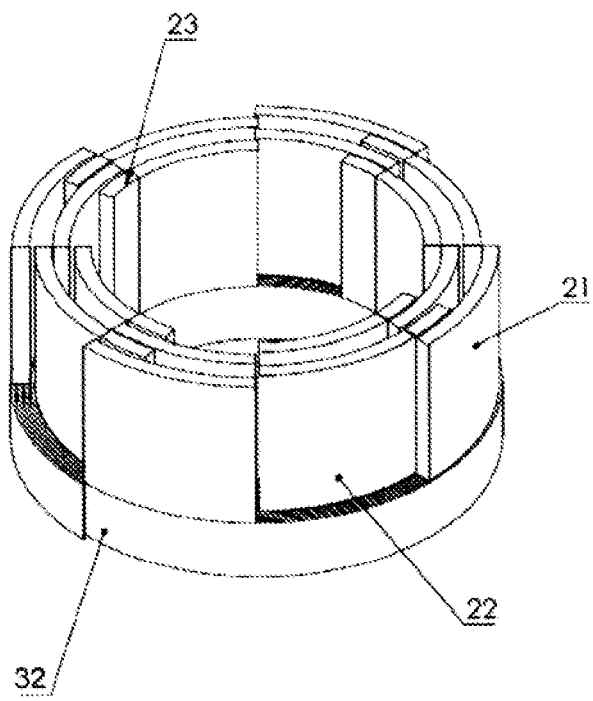
FIG. 7 is a perspective view illustrating still another embodiment of the reflector for the small nuclear reactor according to the present invention, the reflector having overlaps.
Figure 8:
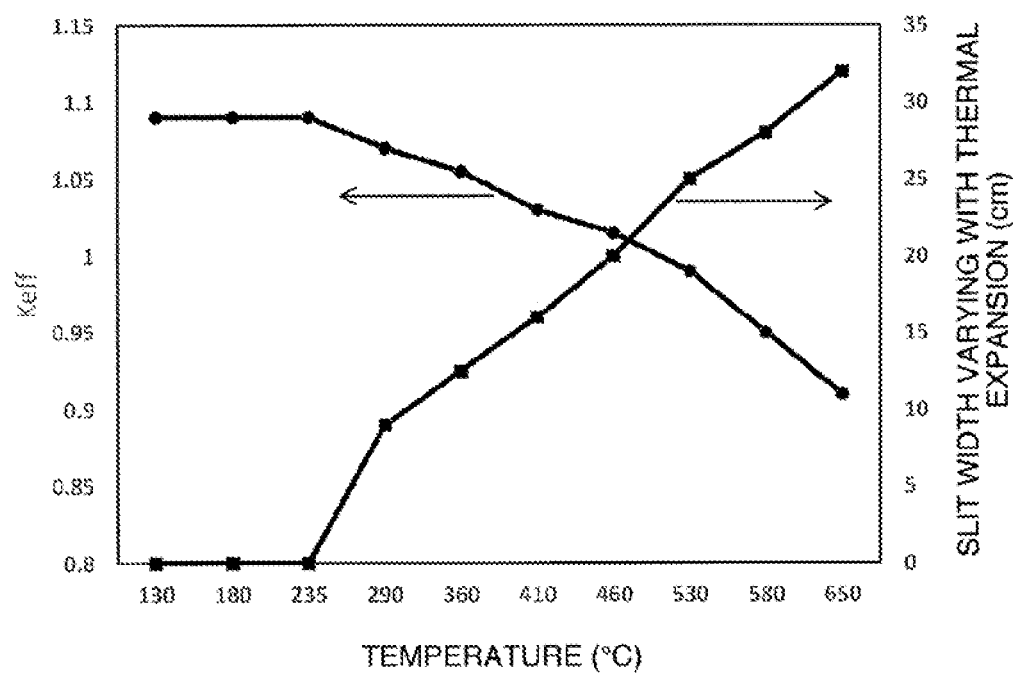
FIG. 8 is a graph showing the temperature dependence of $K_{eff}$ and slit widths varying in response to the thermal expansion when reflectors have overlaps.

A way of increasing the temperature of the critical point, at which $K_{eff}$ reaches 1, will now be described. As illustrated in FIG. 7, the four reflectors A 21 and the four reflectors B 22 into which a reflector is divided are provided, and these reflectors have overlaps 23. The slit widths associated with the thermal expansion in the reflectors are adjusted using the overlaps. FIG. 8 shows the calculations of $K_{eff}$ and the slit widths associated with the thermal expansion when the reflectors have overlaps. As is apparent from the drawing, the temperature at which $K_{eff}$ reaches 1 increased to about 500° C. In this manner, adjusting the lengths of the overlaps in the division reflectors allows the temperature at which $K_{eff}$ reaches 1 to be adjusted.

Third Embodiment

Figure 9:
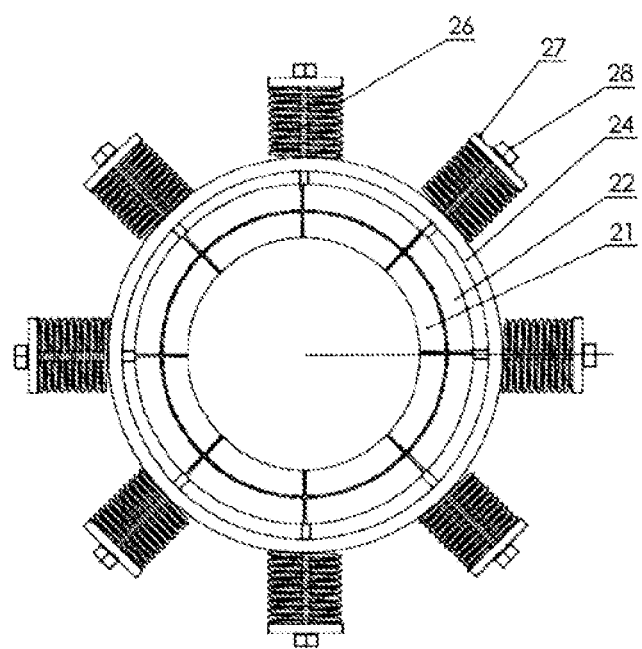
FIG. 9 is a perspective view illustrating yet another embodiment of the reflector for the small nuclear reactor according to the present invention.

FIG. 9 illustrates still another embodiment of the reflector structure according to the present invention. The first and second embodiments shift the division reflectors circumferentially to create each slit between reflectors, thereby controlling $K_{eff}$. The present embodiment moves reflectors radially to control $K_{eff}$. The mechanism will be described with reference to FIG. 9. In order that double-wall reflectors 21, 22, which are eight divisions, can move away from the fuel assemblies with rising temperature, the thermal expansion of adjustment springs 26 is used. First, a fixation cylinder 24 for fixing the adjustment springs 26 is provided outside the eight divisional double-wall reflectors 21, 22. Next, eight spring drive reflector moving jigs for as many division reflectors are mounted outside the fixation cylinder, and each jig has a combination of an adjustment spring support plate 27, a reflector adjusting rod 28, and an adjustment spring 26. The support plate 27 receives the thermal expansion of the adjustment spring 26, and converts the thermal expansion into movement toward outside of the reflector adjusting rod 28 fixed to the support plate 27; as a result, the reflectors 21, 22 fixed to the reflector adjusting rods 28 move outward.

Figure 10:
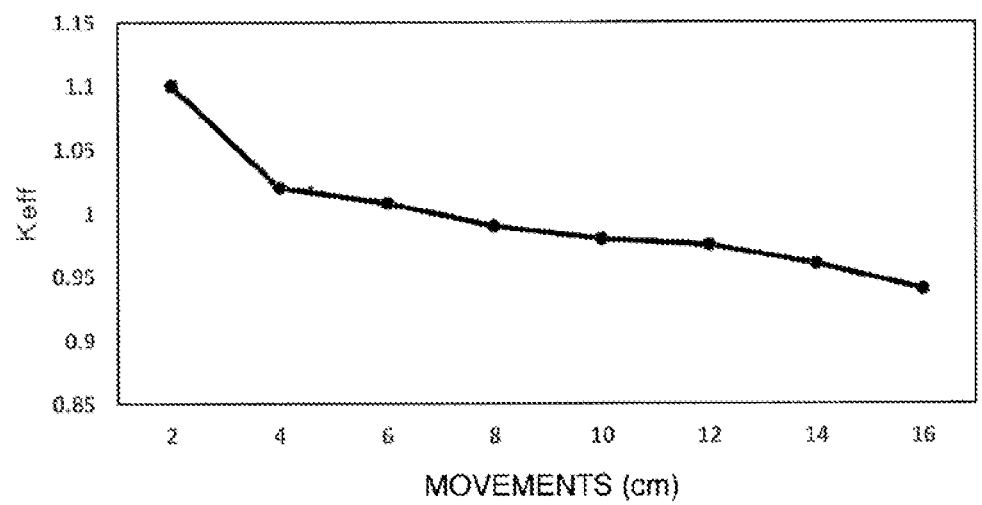
FIG. 10 is a graph showing the relationship between $K_{eff}$ and movements of the reflectors in the embodiment illustrated in FIG. 9.

FIG. 10 shows the relationship between $K_{eff}$ and movements of the reflector adjusting rods 28 (or movements of the reflectors 21, 22) in the embodiment illustrated in FIG. 9. As the distance between the reactor core and the reflectors increases, the reactivity decreases. In this example, when the rods move about 7 cm, $K_{eff}$ reaches 1. Load following control is allowed in this manner.

Fourth Embodiment

Figure 11:
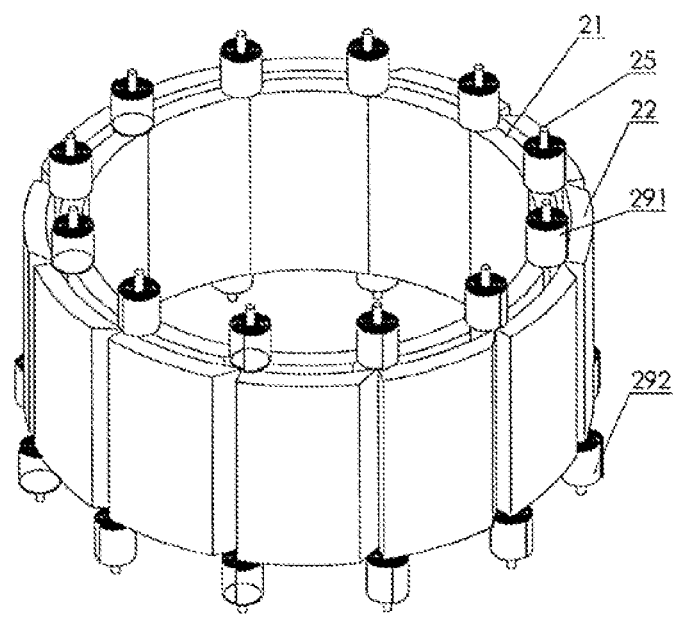
FIG. 11 is a perspective view illustrating reflectors in a closest position in yet another embodiment of the reflector according to the present invention.
Figure 12:
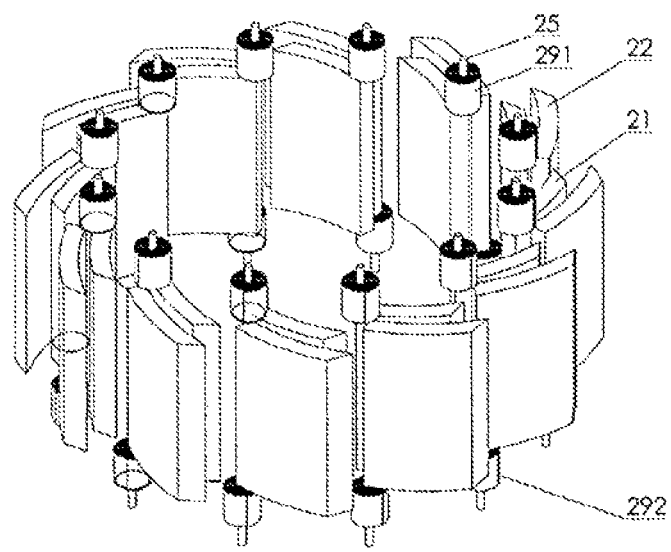
FIG. 12 is a side view illustrating the reflectors in an opened position in the embodiment of the reflectors illustrated in FIG. 11.

FIG. 11 illustrates still another embodiment of the reflector structure according to the present invention. This embodiment employs a structure in which reflectors are opened and closed utilizing thermal expansion. The thermal expansion in upper spiral metallic members 291 and lower spiral metallic members 292 is used to rotate 12 double-wall reflectors 21, 22, into which a reflector is divided, each outward about the corresponding supporting rod 25 made of a spiral metallic member, as the central axis. FIG. 12 illustrates the reflectors opened in response to a temperature rise. The spiral metallic member is suitably made of stainless steel, a nickel based superalloy, or a nickel-cobalt (Co) based superalloy. Furthermore, using spiral metallic members made of bimetal as the upper spiral metallic members 291 and the lower spiral metallic members 292 may allow the reflectors to be rotated more efficiently. The components of the bimetal may be the combination of a nickel (Ni)-iron (Fe) alloy as a low expansion material and one of copper (Cu), nickel, copper-zinc (Zn), nickel-copper, nickel-manganese (Mn)-iron, nickel-chromium (Cr)-iron, and nickel-molybdenum (Mo)-iron as a high expansion material. Because the nuclear reactor is under conditions of high temperatures, the combination of a nickel-iron alloy as a low expansion material and nickel-chromium-iron or nickel-manganese-iron as a high expansion material is suitable. When the neutron reflectors including such metal spirals of bimetal open, more and more neutrons leak from the reflectors. As a result, $K_{eff}$ decreases and the rate of nuclear fission reaction also decreases. Load following control is allowed in this manner.

Fifth Embodiment

Figure 13:
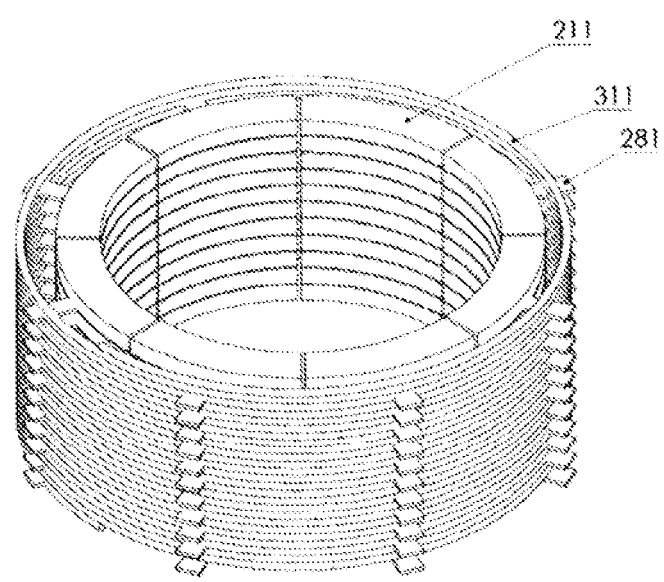
FIG. 13 is a perspective view illustrating still another embodiment of the reflector according to the present invention.

FIG. 13 illustrates still another embodiment of the reflector structure according to the present invention. This embodiment employs a structure in which multi-layer ring reflectors 211 are surrounded by a spiral metallic member 311. The multi-layer ring reflectors 211 and the metallic member 311 are couple to each other with supports 281. Deformation due to thermal expansion of the spring metallic member 311 results in slits between the multilayer reflectors. The slits lower the fast neutron reflection efficiency. Thus, as temperature rises, the nuclear fission efficiency decreases. Conversely, when temperature drops, the reflection efficiency is recovered and thus the nuclear fission efficiency increases. Load following control is allowed in this manner. The spring metallic member is suitably made of stainless steel, a nickel based superalloy, or a nickel-cobalt superalloy.

Sixth Embodiment

Figure 14:
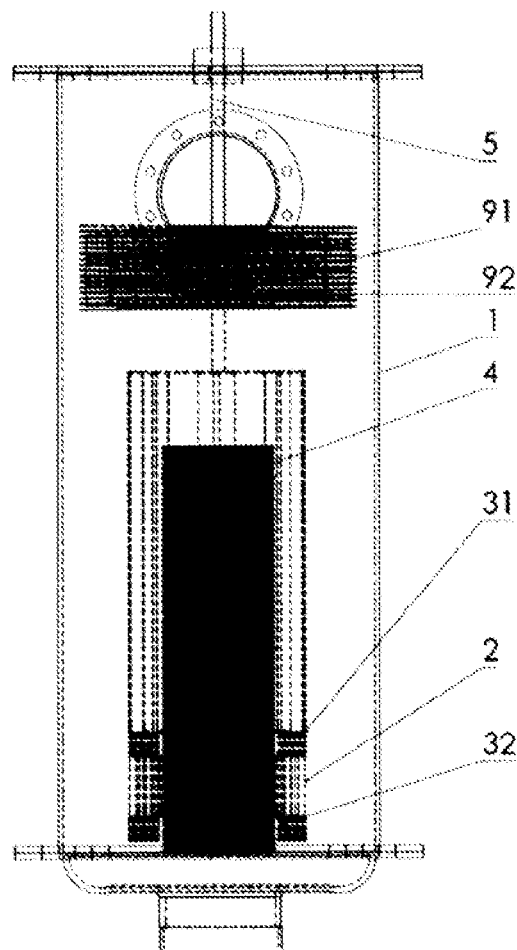
FIG. 14 is a perspective view illustrating an embodiment of a reflector for leaking fast neutrons according to the present invention.
Figure 15:
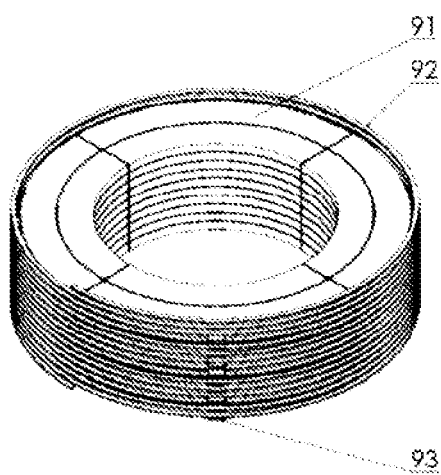
FIG. 15 is a perspective view illustrating the detail of the reflector in FIG. 14.

As described above, the leakage rate of leaking fast neutrons may need to be reduced for the neutron multiplication factor $K_{eff}$ of the small nuclear reactor to become 1 or more. In this case, a reflector is desirably provided at a position other than the circumference of the fuel assemblies. FIG. 14 illustrates such an embodiment. The reactor vessel 1 includes an additional multi-layer reflector 91 above the fuel assemblies 4. To widen slits in this multi-layer reflector at high temperatures, a multi-layer reflector spring 92 is further provided. FIG. 15 illustrates the details of the multi-layer reflector. The multi-layer reflector 91 has a cylindrical space at the center. The fuel assemblies and the moving reflector 2 can pass through the space. The upper multi-layer reflector 91 and the upper spring 92 are coupled to multi-layer reflector support plates 93. This structure allows the leakage rate of leaking fast neutrons to decrease and also enables the leakage rate to be adjusted.

Seventh Embodiment

Figure 16:
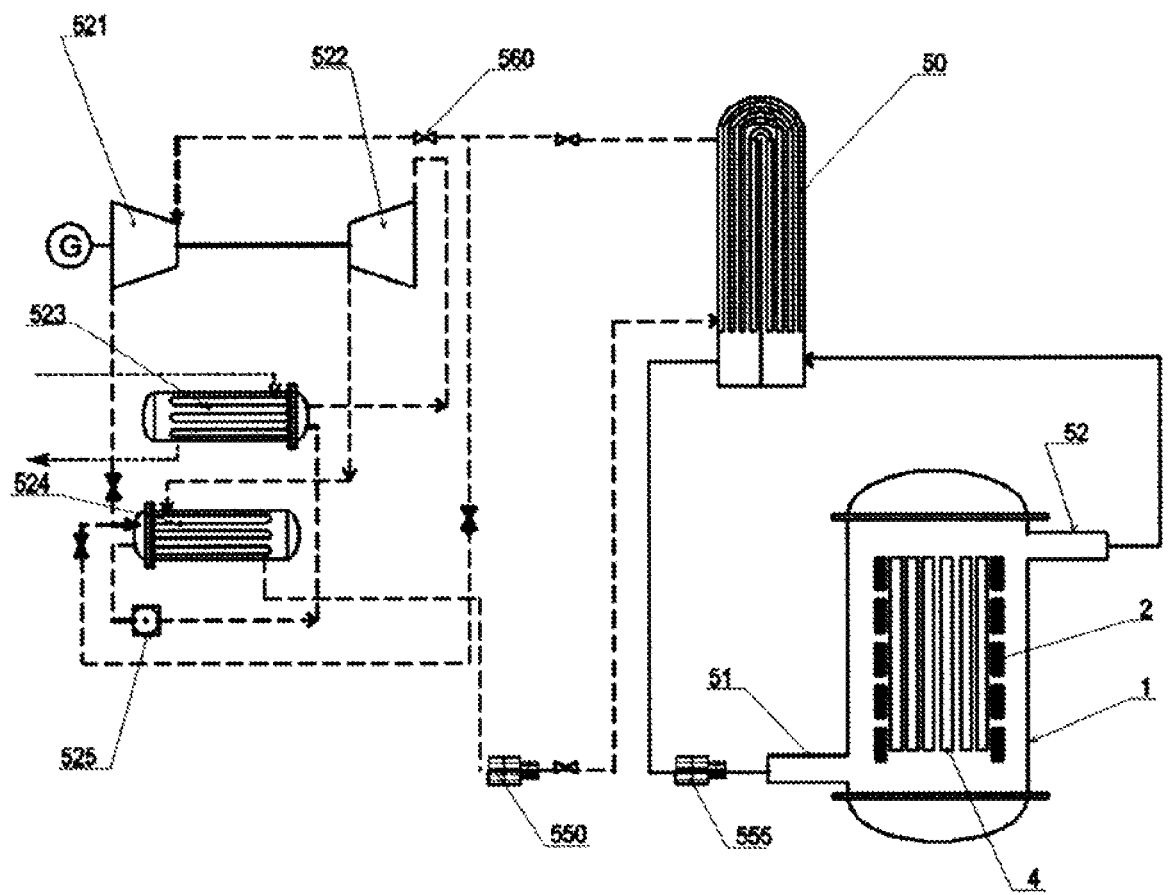
FIG. 16 is a schematic cross-sectional view illustrating an embodiment of a small power generation system including a reactor core employing load following control according to the present invention.

FIG. 16 illustrates an embodiment of a power generation system including a reactor core employing load following control according to the present invention. First, the reactor vessel 1 includes the fuel assemblies 4 and the neutron reflector 2 around the fuel assemblies. In this embodiment, the primary coolant is metallic sodium. For safety purposes, the secondary coolant is carbon dioxide gas. To enhance the power generation efficiency, a supercritical carbon dioxide gas turbine 521 is desirably used. In a main heat exchanger 50, heat is exchanged between the metallic sodium and the supercritical carbon dioxide. The metallic sodium is supplied via an inlet 51 of the reactor vessel 1 and delivered from an outlet 52 to the main heat exchanger 50 with a circulating pump 555.

The main heat exchanger 50 supplies carbon dioxide gas into the supercritical carbon dioxide gas turbine 521. Supercritical carbon dioxide gas passes through a regenerative heat exchanger 524 and a cooler 523 and reaches a compressor 522. The supercritical carbon dioxide gas compressed by the compressor is heated by the regenerative heat exchanger 524 and supplied into the main heat exchanger 50 with a supercritical carbon gas circulating feed pump 550.

Eighth Embodiment

Figure 17:
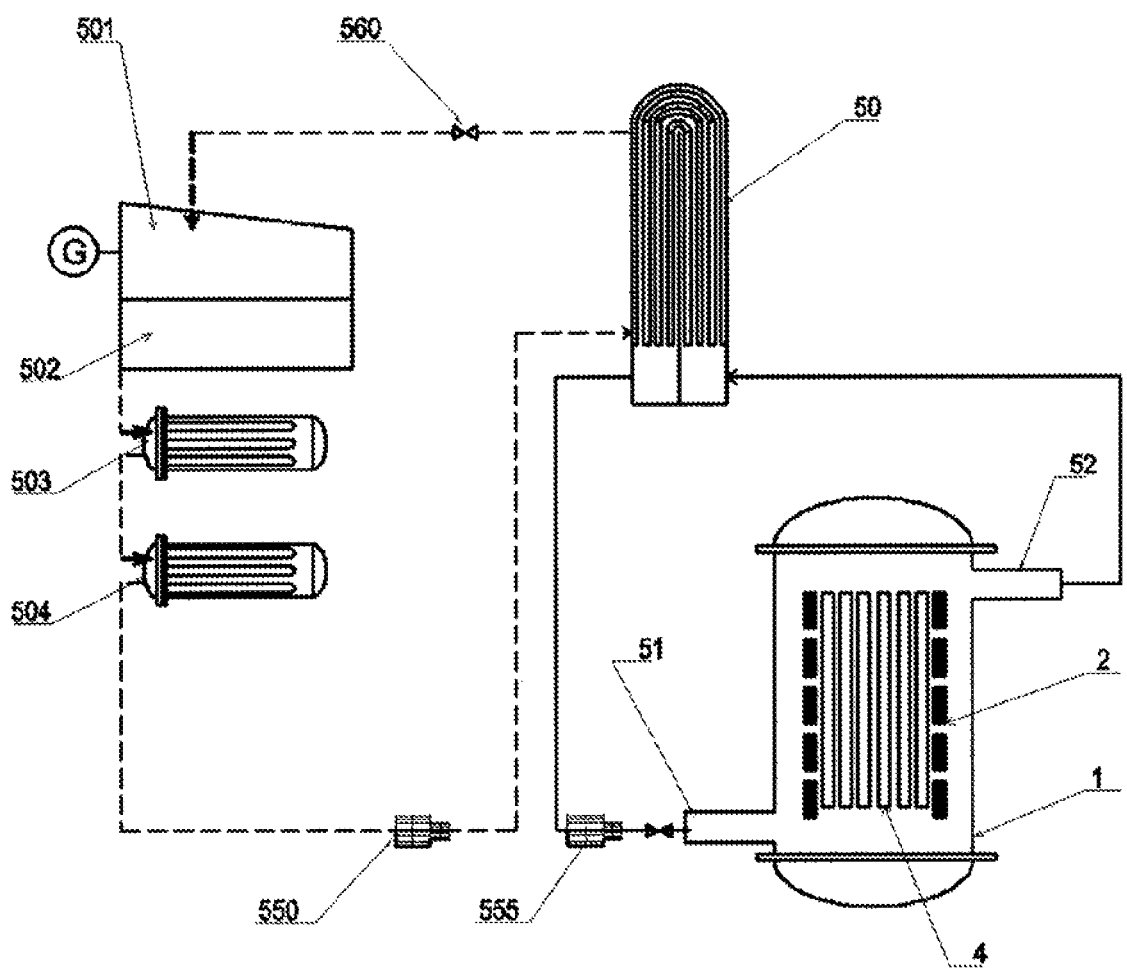
FIG. 17 is a schematic cross-sectional view illustrating another embodiment of the small power generation system including the reactor core employing load following control according to the present invention.

FIG. 17 illustrates another embodiment of the power generation system including the reactor core employing load following control method according to the present invention. In this embodiment, the primary coolant is lead-bismuth. As described above, the secondary coolant in this embodiment is water (light water), and a steam turbine is used for power generation. As illustrated in FIG. 17, the reactor vessel 1 is loaded with the fuel assemblies 4 and the neutron reflector 2 around the fuel assemblies. The reactor vessel 1 is loaded with lead-bismuth as the primary coolant. The primary coolant is received via the inlet 51 and supplied into the main heat exchanger 50 via the outlet 52 with the circulating pump 555. In the main heat exchanger 50, heat is transferred from lead-bismuth to water and steam is generated. This steam drives a steam turbine 501 and a condenser 502 to generate electricity. The condenser 502 turns the steam into water, which is then heated by a first heater 503 and a second heater 504. The heated water is supplied into the main heat exchanger 50 with the circulating feed pump 550.

Ninth Embodiment

Figure 18:
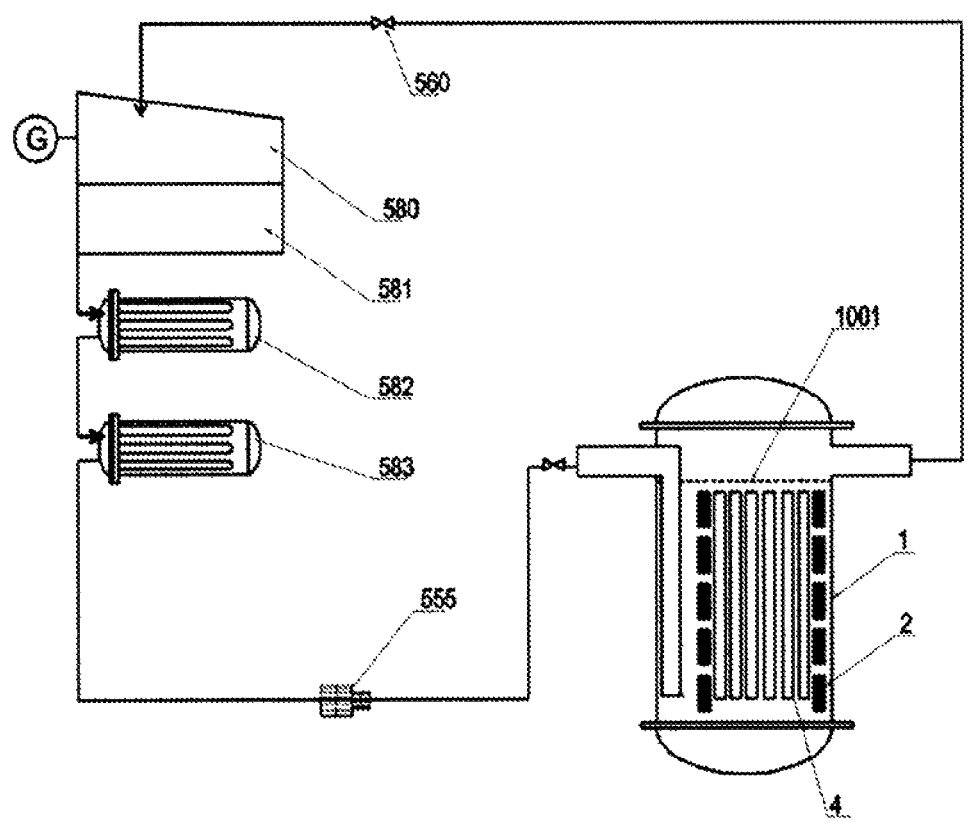
FIG. 18 is a schematic cross-sectional view illustrating still another embodiment of the small power generation system including the reactor core employing load following control according to the present invention.

If the primary coolant is lead or lead-bismuth, heat exchange may also be performed within the reactor vessel 1 because this primary coolant does not react with water. FIG. 18 illustrates such an embodiment. The reactor vessel 1 includes the fuel assemblies 4 and the reflector 2 and is loaded with lead-bismuth as the primary coolant. The secondary coolant is water. The water is supplied into the reactor vessel 1 from the bottom or a side with the circulating pump 555. Steam generated in the reactor vessel 1 drives a steam turbine 580 and a condenser 581 to generate electricity. The water is heated by a first heater 582 and a second heater 583. The heated water is supplied into the reactor vessel 1 again with the circulating pump 555.

Although the embodiments have been described above, the present invention is not limited to them. It will be apparent to those skilled in the art that the embodiments may be altered or modified variously without departing from the spirit of the invention and the scope of the appended claims.

REFERENCE SIGNS LIST 1 reactor vessel
2 neutron reflector
4 fuel assembly
5 reflector support
6 primary coolant inlet pipe
7 primary coolant outlet pipe
20 reflector support plate
21 reflector A
22 reflector B
23 reflector overlap
24 adjustment spring fixation cylinder
25 supporting rod
26 adjustment spring
27 adjustment spring support plate
28 reflector adjusting rod
31 upper spiral metallic member
32 lower spiral metallic member
41 fuel rod
42 fuel assembly support plate
51 reactor vessel inlet
52 reactor vessel outlet
60 main beat exchanger
91 upper multi-layer reflector
92 upper multi-layer reflector spring
93 upper multi-layer reflector support plate
211 ring multilayer reflector
311 spring metallic member
281 multilayer reflector support plate
291 upper angle adjusting spiral metallic member
292 lower angle adjusting spiral metallic member
501, 580 steam turbines
502, 581 condensers
503, 582 first heaters
504, 583 second heaters
521 supercritical carbon dioxide gas turbine
522 supercritical carbon dioxide gas compressor
523 cooler
524 regenerative heat exchanger
525 carbonic acid gas circulating pump 550 circulating feed pump
555 circulating pump
560 isolation valve
1001 lead-bismuth surface

The invention claimed is:

1. A nuclear power generation system comprising
a nuclear reactor,
a heat exchanging system for exchanging heat between a primary coolant for cooling the nuclear reactor and a secondary coolant comprised of carbon dioxide or light water, and
a turbine power generation system for generating power using heat of the secondary coolant;
the nuclear reactor comprising:
a reactor core having fuel assemblies comprising a plurality of fuel rods, the fuel rods comprising cladding tubes containing metallic fuel including at least one selected from uranium-235, uranium-238 and plutonium-239;
a reactor vessel containing the reactor core;
the primary coolant being one of metallic sodium, lead, and lead-bismuth loaded into the reactor vessel and heated by the reactor core; and
at least one neutron reflector disposed around the reactor core,
wherein the at least one neutron reflector disposed around the reactor core has neutron reflection efficiency for achieving criticality in the reactor core with an effective multiplication factor of neutrons emitted from the reactor core being maintained at or above about 1, and
wherein the at least one neutron reflector is coupled to metallic members having a coefficient of thermal expansion greater than a coefficient of thermal expansion of the at least one neutron reflector, and the neutron reflection efficiency of the at least one neutron reflector is changeable utilizing displacement thereof due to dimensional change of the metallic members coupled thereto in accordance with changes in the temperature in the reactor vessel, thereby achieving load following control.

2. The nuclear power generation system according to claim 1, wherein the at least one neutron reflector disposed around the reactor core has a height lower than a height of the reactor core, and is movable upwardly or downwardly along the reactor core with a movement mechanism.

3. The nuclear power generation system according to claim 1, wherein the at least one neutron reflector provided around the reactor core has substantially the same, or smaller, length compared with a full length of the fuel assemblies.

4. The nuclear power generation system according to claim 1, wherein the metallic members comprise at least one of elastic spring or spiral members extending around or above the fuel assemblies.

5. The nuclear power generation system according to claim 1,
wherein the at least one neutron reflector comprises a first neutron reflector and a second neutron reflector each extending along a different concentric circle extending around a center of the reactor core, each of the first and second neutron reflectors divided into two or more sections extending along their respective concentric circles,
wherein the sections of the first neutron reflector are coupled to a first spiral metallic member provided on a concentric circle about the reactor core, and
wherein sections of the first neutron reflector and the sections of the second neutron reflector are moveable, with respect to one another, in a circumferential direction about the reactor core,
the movement in the circumferential direction forming slits therebetween in a circumferential direction, wherein the widths of the slits in the circumferential direction are changeable as a result of dimensional change of the first spiral metallic member based on the temperature in the reactor vessel.

6. The nuclear power generation system according to claim 5, wherein each of the first and second neutron reflectors are further radially divided into two or more sections.

7. The nuclear power generation system according to claim 5, wherein the sections of the second neutron reflector are coupled to a second spiral metallic member disposed along a concentric circle of the reactor core, and the spiral directions of the first spiral metallic member and the second spiral metallic member are in opposite directions.

8. The nuclear power generation system according to claim 1, wherein a material of the at least one neutron reflector is selected from beryllium, beryllium oxide, graphite, carbon, and stainless steel.

9. The nuclear power generation system according to claim 5, wherein carbon is provided as a lubricant between the sections of the first neutron reflector and the sections of the second neutron reflectors of the second group.

10. The nuclear power generation system according to claim 5, wherein the sections of the first neutron reflector and the sections of the second neutron reflector overlap in the radial direction from the center of the reactor core, and the widths of the radial overlaps define the temperature at which the slits open and at which the criticality reaches 1.

11. The nuclear power generation system according to claim 1,
wherein the metallic members comprise
adjustment springs having opposed first and second ends, and
a fixation cylinder, against which the first end of the adjustment springs contact, is provided circumferentially outside of the circumferential location of the at least one neutron reflector;
the at least one neutron reflector is divided into two or more arcuate sections extending along a concentric circle extending around the reactor core; and
a plurality of reflector moving jigs corresponding in number to the number of sections of the neutron reflector, each reflector jig comprising an adjustment spring support plate and a neutron reflector adjusting rod; and
each adjustment spring contacts, at its second end, the adjustment spring support plate provided outside the fixation cylinder,
wherein each neutron reflector adjusting rod is coupled to a corresponding neutron reflector at one end thereof and fixed to the adjustment spring support plate at an opposite end thereof, and the reflector adjusting rod moves the neutron reflector with respect to the location of the fuel assemblies upon changes in the temperature of the adjustment springs whereby load following control for the energy output from the nuclear reactor is enabled.

12. The nuclear power generation system according to claim 1, wherein the at least one neutron reflector comprises a multi-layer plurality of rings, each ring comprising a plurality of ring segments extending circumferentially around the fuel rods; and, the metallic members are disposed radially outwardly of and around the multi-layer neutron reflectors rings, wherein different ring segments of the multi-layer plurality of rings are coupled to different portions of the metallic members, wherein, upon a change in temperature of the metallic members, slits are formed between the neutron reflector rings in the circumferential direction and the widths of the slits are dependent upon thermally induced dimensional change of the metallic members to adjust the neutron leakage, whereby load following control for output from the nuclear reactor is enabled.

13. The nuclear power generation system according to claim 1, wherein the at least one neutron reflector comprises a plurality of neutron reflector sections, each of the neutron reflector sections comprising a first end coupled to a supporting rod and a second end distal to the first end, the supporting rods lying on a circular path extending around the reactor core, wherein the first end of each neutron reflector section is rotatable about the supporting rod and thereby form a slit extending in the circumferential direction about the reactor core, and each of the metallic members comprise spiral metallic members connected at a first end thereof to one of the supporting rods and at a second end thereof to the neutron reflector section associate to the rod to which it is connected, wherein changes in the temperature of the spiral metallic members causes dimensional change in the spiral metallic members, thereby causing the first end of the neutron reflector section connected thereto to rotate about the supporting rod to cause the second end of that neutron reflector section to move away from first end of an adjacent neutron reflector section to form a slit therebetween, wherein the span of the slit between the second end of the neutron reflector section and the adjacent first end of the adjacent neutron reflector section varies based on the temperature of the spiral metallic member, whereby load following control for output from the nuclear reactor is enabled.

14. The nuclear power generation system according to claim 4, wherein the at least one of an elastic spring or a spiral metallic members comprise at least one of stainless steel, a nickel based superalloy, and a nickel-cobalt based superalloy, or a bimetal.

15. The nuclear power generation system according to claim 1, wherein a neutron absorber is provided outside the neutron reflector.

16. The nuclear power generation system according to claim 15, wherein the neutron absorber comprises actinoids.

17. The nuclear power generation system according to claim 1, wherein the reactor core has a plurality of fuel rods comprise cladding tubes comprising at least one of ferritic stainless steel or chromium-molybdenum steel containing metallic fuel selected from at least one of an alloy of zirconium, uranium-235, uranium-238, and plutonium-239 or an alloy of zirconium and one selected from uranium-235, uranium-238 and plutonium-239.

18. The nuclear power generation system according to claim 1, wherein the heat exchanging system comprises a main heat exchanger supplied with the primary coolant heated by the nuclear reactor through a conduit, the main heat exchanger including a circulating secondary coolant heated by heat exchange with the primary coolant.

19. The nuclear power generation system according claim 1, wherein the primary coolant comprises lead or lead-bismuth and the secondary coolant comprises light water heated by heat exchange with the primary coolant.

* * * * *